(12) United States Patent
Nobe et al.

(10) Patent No.: US 11,424,702 B2
(45) Date of Patent: Aug. 23, 2022

(54) MOTOR DRIVING APPARATUS, MOTOR DRIVING METHOD, AND TIMEPIECE

(71) Applicant: Seiko Instruments Inc., Chiba (JP)

(72) Inventors: Tetsuya Nobe, Chiba (JP); Satoshi Sakai, Chiba (JP); Kazumi Sakumoto, Chiba (JP); Kosuke Yamamoto, Chiba (JP); Akihito Okumura, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 329 days.

(21) Appl. No.: 16/801,816

(22) Filed: Feb. 26, 2020

(65) Prior Publication Data

US 2020/0313583 A1 Oct. 1, 2020

(30) Foreign Application Priority Data

Mar. 27, 2019 (JP) .............................. JP2019-060547

(51) Int. Cl.
*H02P 8/18* (2006.01)
*G04C 3/14* (2006.01)

(52) U.S. Cl.
CPC . *H02P 8/18* (2013.01); *G04C 3/14* (2013.01)

(58) Field of Classification Search
CPC ..... H02P 8/18; H02P 8/02; H02P 8/04; G04C 3/14
See application file for complete search history.

(56) References Cited

U.S. PATENT DOCUMENTS

| 2010/0238768 | A1* | 9/2010 | Kato | H02P 8/02 |
| | | | | 368/80 |
| 2011/0002197 | A1* | 1/2011 | Ogasawara | G04F 5/04 |
| | | | | 368/187 |
| 2012/0182840 | A1* | 7/2012 | Kamiyama | H02P 8/12 |
| | | | | 318/696 |
| 2013/0182542 | A1* | 7/2013 | Yamamoto | G04C 3/143 |
| | | | | 368/76 |
| 2014/0071794 | A1* | 3/2014 | Yamamoto | G04C 3/143 |
| | | | | 368/76 |
| 2018/0088533 | A1* | 3/2018 | Saito | H02P 8/16 |
| 2019/0041804 | A1* | 2/2019 | Takyoh | G04C 13/11 |

FOREIGN PATENT DOCUMENTS

JP 2006101618 A 4/2006

* cited by examiner

*Primary Examiner* — Muhammad S Islam
*Assistant Examiner* — Devon A Joseph
(74) *Attorney, Agent, or Firm* — Crowell & Moring LLP

(57) ABSTRACT

A motor driving apparatus including a driving circuit for supplying a first pulse with which a first coil included in a two-phase stepping motor generates a first magnetic flux, a second pulse with which a second coil included in the stepping motor generates a second magnetic flux opposite to the first magnetic flux, a third pulse with which the first coil generates the second magnetic flux, and a fourth pulse with which the second coil generates the first magnetic flux, to the stepping motor. The driving circuit supplies the second pulse, the third pulse, and the fourth pulse in this order to the stepping motor in a state of being stopped to start the stepping motor, and supplies the first pulse, the second pulse, the third pulse, and the fourth pulse in this order to the stepping motor after starting to continuously drive the stepping motor.

14 Claims, 6 Drawing Sheets

MOTOR DRIVING APPARATUS, MOTOR DRIVING METHOD, AND TIMEPIECE

RELATED APPLICATIONS

This application claims priority to Japanese Patent Application No. 2019-060547, filed on Mar. 27, 2019, the entire content of which is incorporated herein by reference.

BACKGROUND OF THE INVENTION

1. Field of the Invention

Embodiments of the present invention relate to a motor driving apparatus, a motor driving method, and a timepiece.

2. Description of the Related Art

In recent years, an analog electronic timepiece has been developed, which performs communication with a mobile terminal such as a smartphone or a tablet, and drives a pointer according to a result of the communication. Since such an analog electronic timepiece needs to be rotated at a high speed clockwise and counterclockwise, the analog electronic timepiece may include a two-phase stepping motor having two coils. An example of such a two-phase stepping motor is a reversible stepping motor disclosed in JP-A-2006-101618.

However, in the reversible stepping motor, a third driving pulse having a braking effect that prevents a rotor from rotating more than one step each time the rotor is rotated one step, that is, 180 degrees, is input, so that the rotor may not be rotated at a sufficiently high speed.

SUMMARY OF THE INVENTION

Embodiments of the present invention are made in view of the problem described above, and an object thereof is to provide a motor driving apparatus, a motor driving method, and a timepiece, in which a rotor can stably be rotated at a high speed.

In order to achieve the above object, according to an embodiment of the present invention, there is provided a motor driving apparatus including a driving circuit for supplying a first driving pulse with which a first coil included in a two-phase stepping motor generates a first magnetic flux, a second driving pulse with which a second coil included in the two-phase stepping motor generates a second magnetic flux opposite to the first magnetic flux, a third driving pulse with which the first coil generates the second magnetic flux, and a fourth driving pulse with which the second coil generates the first magnetic flux, to the two-phase stepping motor. The driving circuit supplies the second driving pulse, the third driving pulse, and the fourth driving pulse in this order to the two-phase stepping motor in a state of being stopped to start the two-phase stepping motor, and supplies the first driving pulse, the second driving pulse, the third driving pulse, and the fourth driving pulse in this order to the two-phase stepping motor after starting to continuously drive the two-phase stepping motor.

In addition, in the motor driving apparatus according to the embodiment of the present invention, a standby time may be set between a timing for supplying the second driving pulse and a timing for supplying the third driving pulse, and between timing for supplying the fourth driving pulse and a timing for supplying the first driving pulse, and when the standby time is shorter than a predetermined time, the driving circuit may continuously drive the two-phase stepping motor.

In addition, in the motor driving apparatus according to the embodiment of the present invention, a control circuit may control pulse lengths of the first driving pulse, the second driving pulse, the third driving pulse, and the fourth driving pulse.

In addition, in the motor driving apparatus according to the embodiment of the present invention, energy of the second driving pulse supplied to the two-phase stepping motor in a state of being stopped may be larger than energy of the second driving pulse supplied to the two-phase stepping motor after starting.

In addition, in the motor driving apparatus according to the embodiment of the present invention, a length of the second driving pulse supplied to the two-phase stepping motor in a state of being stopped may be longer than a length of the second driving pulse supplied to the two-phase stepping motor after starting.

In order to achieve the object described above, a motor driving method according to another embodiment of the present invention comprises a driving function. The driving function includes supplying a first driving pulse with which a first coil included in a two-phase stepping motor generates a first magnetic flux, a second driving pulse with which a second coil included in the two-phase stepping motor generates a second magnetic flux opposite to the first magnetic flux, a third driving pulse with which the first coil generates the second magnetic flux, and a fourth driving pulse with which the second coil generates the first magnetic flux, to the two-phase stepping motor. The driving function supplies the second driving pulse, the third driving pulse, and the fourth driving pulse in this order to the two-phase stepping motor in a state of being stopped to start the two-phase stepping motor, and supplies the first driving pulse, the second driving pulse, the third driving pulse, and the fourth driving pulse in this order to the two-phase stepping motor after starting to continuously drive the two-phase stepping motor.

In order to achieve the object described above, according to still another embodiment of the present invention, there is provided a timepiece including the motor driving apparatus described above.

DETAILED DESCRIPTION OF THE PREFERRED EMBODIMENTS

Figure 1:
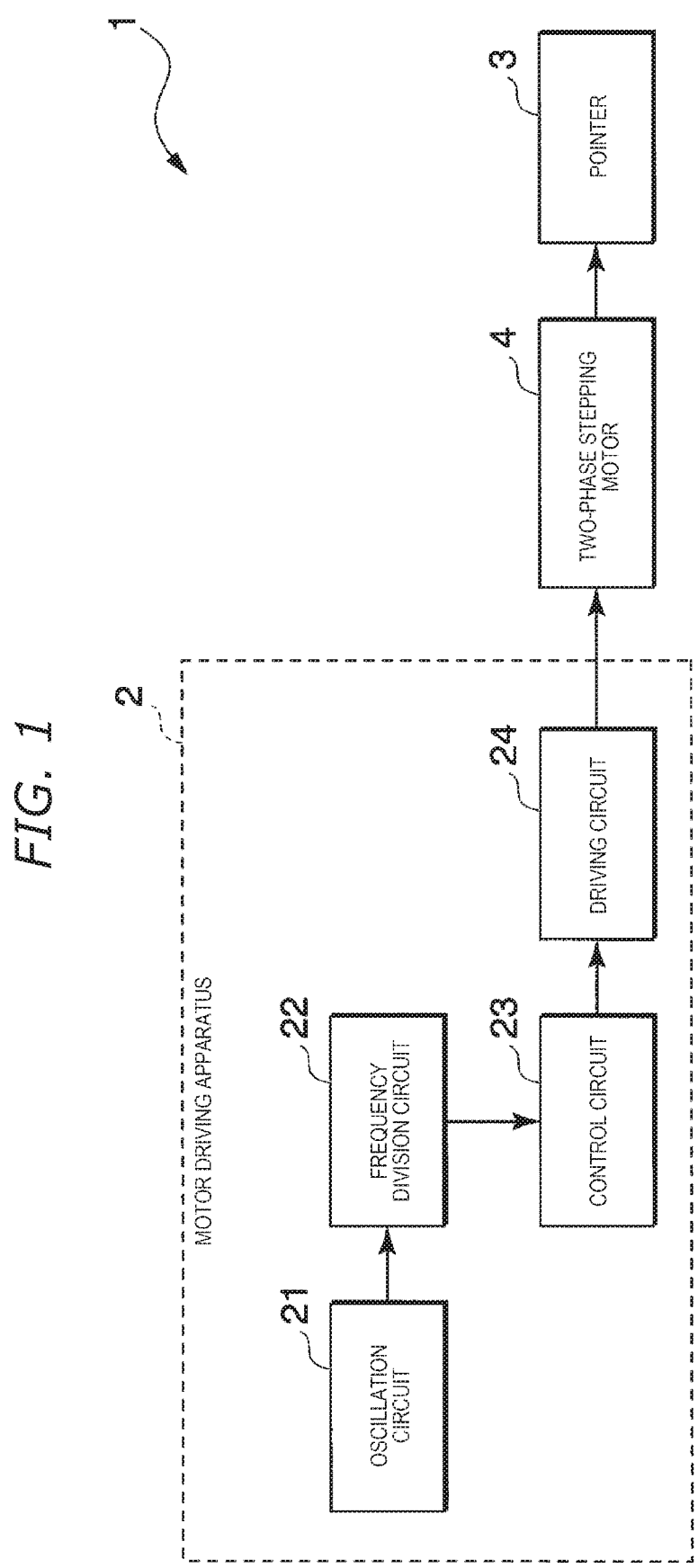
FIG. 1 is a diagram illustrating an example of a timepiece according to an embodiment.

A timepiece according to an embodiment will be described with reference to FIGS. 1 to 8. FIG. 1 is a diagram illustrating an example of the timepiece according to the embodiment. As illustrated in FIG. 1, a timepiece 1 includes a motor driving apparatus 2, a pointer 3, and a two-phase stepping motor 4. As illustrated in FIG. 1, the motor driving apparatus 2 includes an oscillation circuit 21, a frequency division circuit 22, a control circuit 23, and a driving circuit 24.

The oscillation circuit 21 generates a signal having a predetermined frequency and transmits the signal to the frequency division circuit 22. The frequency division circuit 22 divides the signal received from the oscillation circuit 21 to generate a timepiece signal serving as a reference for time measurement, and transmits the timepiece signal to the control circuit 23. The control circuit 23 appropriately controls each element constituting the timepiece 1 as necessary. Details of the control executed by the control circuit 23 will be described later. The driving circuit 24 supplies a driving pulse to the two-phase stepping motor 4 according to the control executed by the control circuit 23. Details of the driving pulse transmitted by the driving circuit 24 will be described later.

The pointer 3 includes, for example, a pointer for realizing a function other than a function of displaying an hour hand, a minute hand, a second hand, or a time.

Figure 2:
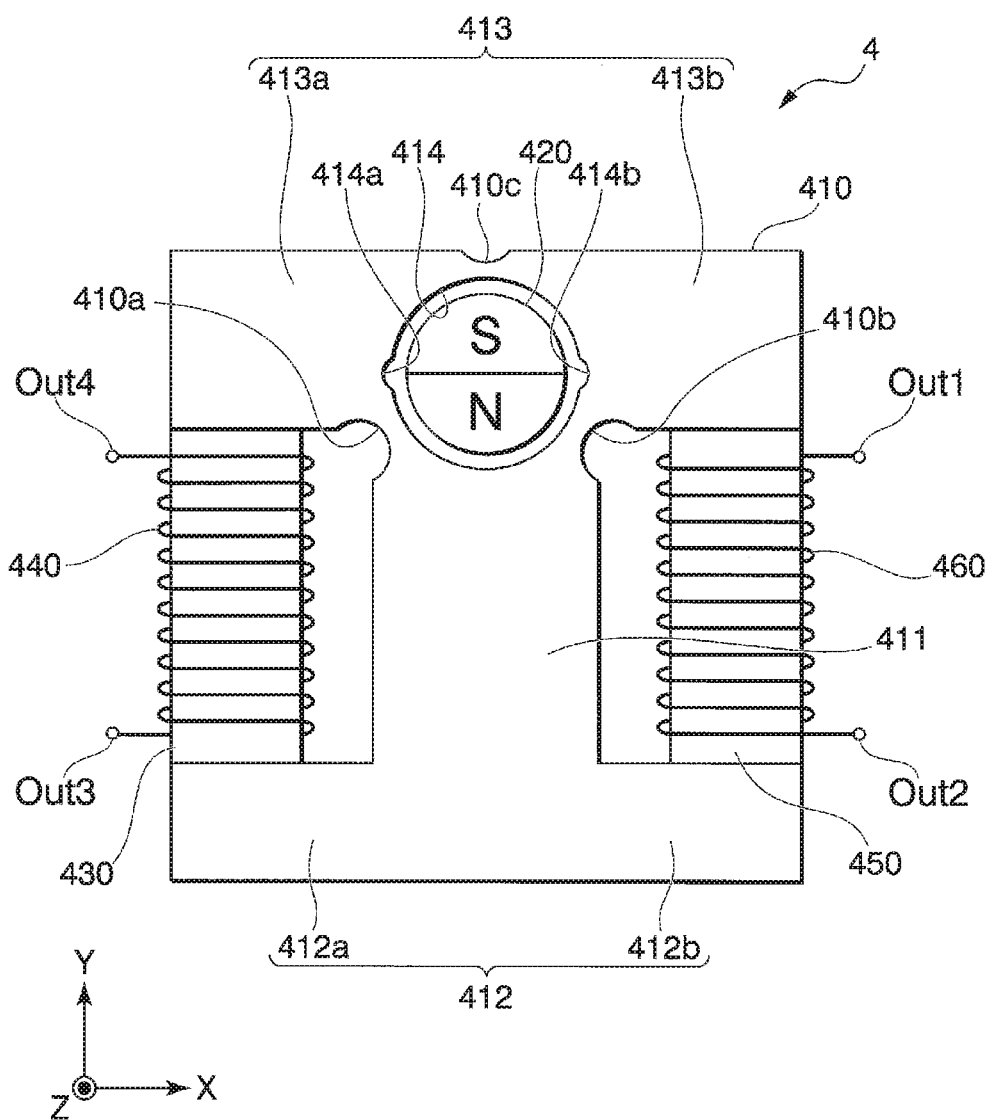
FIG. 2 is a view illustrating an example of a two-phase stepping motor according to the embodiment.

FIG. 2 is a view illustrating an example of the two-phase stepping motor according to the embodiment. As illustrated in FIG. 2, the two-phase stepping motor 4 includes a stator 410, a rotor 420, a coil core 430, a coil 440, a coil core 450, and a coil 460. In the following description, an X-axis, a Y-axis, and a Z-axis illustrated in FIG. 2 are used as appropriate. The X-axis, the Y-axis, and the Z-axis are orthogonal to each other and form a right-side system.

The stator 410 is made of a material having a high magnetic permeability, for example, Permalloy, and includes a center yoke 411, a side yoke 412, and a side yoke 413 integrally formed with each other.

The center yoke 411 is a rod-like member extending along the Y-axis, and has an end portion in a -Y direction connected to the side yoke 412 and an end portion in a +Y direction connected to the side yoke 413. The side yoke 412 includes an overhang portion 412a extending in a -X direction from the end portion of the center yoke 411 in the -Y direction and an overhang portion 412b extending in a +X direction from the end portion of the center yoke 411 in the -Y direction. The side yoke 413 includes an overhang portion 413a extending in the -X direction from the end portion of the center yoke 411 in the +Y direction, and an overhang portion 413b extending in the +X direction from the end portion of the center yoke 411 in the +Y direction.

The stator 410 has a cutout 410a, a cutout 410b, and a cutout 410c. The cutout 410a, the cutout 410b, and the cutout 410c are all cutouts in which each cross section is a circular arc in a plane parallel to an XY plane. The cutout 410a is formed in a portion where the end portion of the center yoke 411 in the +Y direction and the overhang portion 413a are connected to each other. The cutout 410b is formed in a portion where the end portion of the center yoke 411 in the +Y direction and the overhang portion 413b are connected to each other. The cutout 410c is formed at a portion where the end portion of the overhang portion 413a in the +X direction and the end portion of the overhang portion 413b in the -X direction are connected to each other.

The cutout 410a, the cutout 410b, and the cutout 410c are locally narrowed between themselves and a rotor accommodation hole 414. Therefore, all the cutout 410a, the cutout 410b, and the cutout 410c are made such that magnetic saturation easily occurs in the locally narrowed portions, and the stator 410 is magnetically divided into three portions. Therefore, in the stator 410, the end portion of the overhang portion 413a in the +X direction serves as a first magnetic pole portion, the end portion of the overhang portion 413b in the -X direction serves as a second magnetic pole portion, and the end portion of the center yoke 411 in the +Y direction serves as a third magnetic pole portion.

Further, the stator 410 includes the rotor accommodation hole 414. The rotor accommodation hole 414 is formed in a region where the end portion of the center yoke 411 in the +Y direction, the overhang portion 413a, and the overhang portion 413b are connected to each other, and is a hole having a cylindrical shape having a central axis parallel to the Z-axis, and the rotor 420 is inserted therein. Further, a cutout 414a and a cutout 414b are formed inside the rotor accommodation hole 414. The cutout 414a and the cutout 414b are formed such that each cross section is cut out in a circular arc in a plane parallel to the XY plane. Further, the cutout 414a and the cutout 414b determine a minimum magnetic potential. Therefore, as illustrated in FIG. 2, the rotor 420 stably stops at an angle at which a magnetic pole axis thereof is orthogonal to a line segment connecting the cutout 414a and the cutout 414b on the XY plane.

The rotor 420 is formed in a cylindrical shape and is inserted in a rotatable state with respect to the rotor accommodation hole 414 formed in the stator 410. Further, since the rotor 420 is magnetized, the rotor 420 has an N pole and an S pole. The rotor 420 rotates in a forward direction to rotate the pointer 3 clockwise via a train wheel, and rotates in a reverse direction to rotate the pointer 3 counterclockwise via the train wheel.

The coil core 430 is a rod-like member extending along the Y-axis, the end portion in the +Y direction is in contact with the overhang portion 413a, and the end portion in the -Y direction is in contact with the overhang portion 412a. In addition, the coil 440 is wound around the coil core 430.

The coil 440 is magnetically coupled to the first magnetic pole portion and the third magnetic pole portion described above by the coil core 430. The coil 440 includes a terminal Out3 and a terminal Out4 connected to the driving circuit 24 described above. When a potential of the terminal Out3 is set to a high level, a potential of the terminal Out4 is set to a low level, and a current flows from the terminal Out3 to the terminal Out4, the coil 440 generates a magnetic flux in the -Y direction. On the other hand, when the potential of the terminal Out4 is set to a high level, the potential of the terminal Out3 is set to a low level, and a current flows from the terminal Out4 to the terminal Out3, the coil 440 generates a magnetic flux in the +Y direction.

The coil core 450 is a rod-like member extending along the Y-axis, an end portion in the +Y direction is in contact with the overhang portion 413b, and an end portion in the -Y direction is in contact with the overhang portion 412b. The coil 460 is wound around the coil core 450.

The coil 460 is the same as the coil 440 in a conductor material, a conductor diameter, and the number of windings of the conductor, and is magnetically coupled to the second magnetic pole portion and third magnetic pole portion by the coil core 450. The coil 460 includes a terminal Out1 and a terminal Out2 connected to the driving circuit 24 described above. When a potential of the terminal Out2 is set to a high level, a potential of the terminal Out1 is set to a low level, and a current flows from the terminal Out2 to the terminal Out1, the coil 460 generates a magnetic flux in the −Y direction. On the other hand, when the potential of the terminal Out1 is set to a high level, the potential of the terminal Out2 is set to a low level, and a current flows from the terminal Out1 to the terminal Out2, the coil 460 generates a magnetic flux in the +Y direction.

All the first magnetic pole portion, the second magnetic pole portion, and the third magnetic pole portion described above are switched in polarity according to the magnetic flux generated by the coil 440 and the magnetic flux generated by the coil 460.

Next, details of the driving pulse that the driving circuit 24 inputs to the two-phase stepping motor 4 will be described with reference to FIGS. 3A to 4E. The driving pulse referred to here is a voltage that the driving circuit 24 applies to the terminal Out4 and the terminal Out3 of the coil 440, and to the terminal Out2 and the terminal Out1 of the coil 460. These voltages allow a current to flow through the coil 440 and the coil 460, and generate a magnetic flux described later.

FIGS. 3A to 4E are views illustrating an example of a relationship between the magnetic flux generated by the coil included in the two-phase stepping motor according to the embodiment and an angle at which the rotor is stably stopped. In FIGS. 3A to 4E, the symbols illustrated in FIG. 2, the coil 440, and the coil 460 are not illustrated.

Figure 3A:
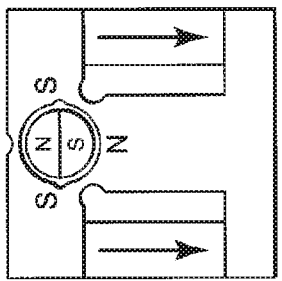
FIGS. 3A to 3E are views illustrating an example of a relationship between a magnetic flux generated by a coil included in the two-phase stepping motor according to the embodiment and an angle at which a rotor is stably stopped.

FIG. 3A illustrates a state in which no current flows through both the coil 440 and the coil 460. In this case, neither the coil 440 nor the coil 460 generates the magnetic flux. Therefore, none of the first magnetic pole portion, the second magnetic pole portion, and the third magnetic pole portion is excited. Therefore, the rotor 420 is stably stopped at 0 degrees which is an angle determined by the cutout 414a and the cutout 414b.

Figure 3B:
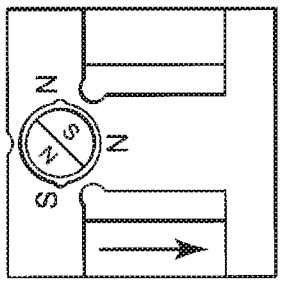

FIG. 3B illustrates a state in which the driving circuit 24 sets the voltage at the terminal Out4 and the voltage at the terminal Out3 of the coil 440 to the low level, sets the voltage at the terminal Out1 of the coil 460 to the high level, and sets the voltage at the terminal Out2 to the low level. In this case, the coil 440 does not generate the magnetic flux. On the other hand, the coil 460 generates the magnetic flux in the +Y direction. Therefore, the first magnetic pole portion is excited to the S pole, the second magnetic pole portion is excited to the N pole, and the third magnetic pole portion is excited to the S pole. Therefore, since the N pole is attracted to the first magnetic pole portion and the third magnetic pole portion, and the S pole is attracted to the second magnetic pole portion, the rotor 420 is stably stopped in a state of being rotated 45 degrees clockwise. The driving pulse for generating the magnetic flux illustrated in FIG. 3B is called a 45-degree driving pulse.

Figure 3C:
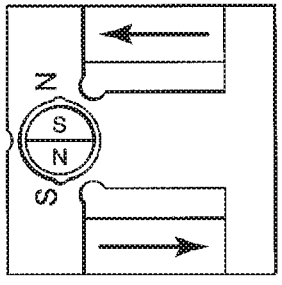

FIG. 3C illustrates a state in which the driving circuit 24 sets the voltage at the terminal Out4 of the coil 440 to the low level, sets the voltage at the terminal Out3 to the high level, sets the voltage at the terminal Out1 of the coil 460 to the high level, and sets the voltage at the terminal Out2 to the low level. In this case, the coil 440 generates the magnetic flux in the −Y direction. On the other hand, the coil 460 generates the magnetic flux in the +Y direction. Therefore, the first magnetic pole portion is excited to the S pole, the second magnetic pole portion is excited to the N pole, and the magnetic flux generated by the coil 440 and the magnetic flux generated by the coil 460 cancel each other in the third magnetic pole portion. Therefore, since the N pole is attracted to the first magnetic pole portion and the S pole is attracted to the second magnetic pole portion, the rotor 420 is stably stopped in a state of being rotated 90 degrees clockwise. The driving pulse for generating the magnetic flux illustrated in FIG. 3C is called a 90-degree driving pulse.

Figure 3D:
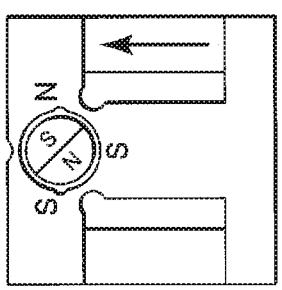

FIG. 3D illustrates a state in which the driving circuit 24 sets the voltage at the terminal Out4 of the coil 440 to the low level, sets the voltage at the terminal Out3 to the high level, and sets the voltage at the terminal Out1 and the voltage at the terminal Out2 of the coil 460 to the low level. In this case, the coil 440 generates the magnetic flux in the −Y direction. On the other hand, the coil 460 does not generate the magnetic flux. Accordingly, the first magnetic pole portion is excited to the S pole, the second magnetic pole portion is excited to the N pole, and the third magnetic pole portion is excited to the N pole. Therefore, since the N pole is attracted to the first magnetic pole portion and the S pole is attracted to the second magnetic pole portion and the third magnetic pole portion, the rotor 420 is stably stopped in a state of being rotated 135 degrees clockwise. The driving pulse for generating the magnetic flux illustrated in FIG. 3D is called a 135-degree driving pulse.

Figure 3E:
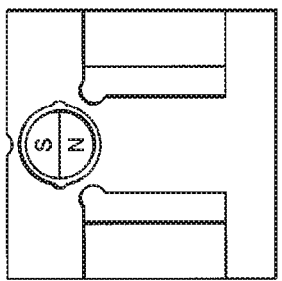

FIG. 3E illustrates a state in which the driving circuit 24 sets the voltage at the terminal Out4 of the coil 440 to the low level, sets the voltage at the terminal Out3 to the high level, sets the voltage at the terminal 010 of the coil 460 to the low level, and sets the voltage at the terminal Out2 to the high level. In this case, the coil 440 and the coil 460 generate the magnetic flux in the −Y direction. Therefore, the first magnetic pole portion is excited to the S pole, the second magnetic pole portion is excited to the S pole, and the third magnetic pole portion is excited to the N pole. Therefore, since the N pole is attracted to the first magnetic pole portion and the second magnetic pole portion, and the S pole is attracted to the third magnetic pole portion, the rotor 420 is stably stopped in a state of being rotated 180 degrees clockwise. The driving pulse for generating the magnetic flux illustrated in FIG. 3E is called a 180-degree driving pulse.

Figure 4A:
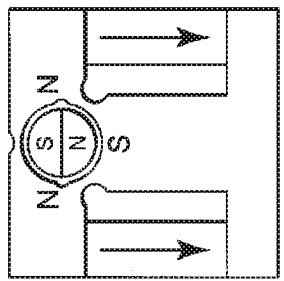
FIGS. 4A to 4E are views illustrating an example of a relationship between a magnetic flux generated by the coil included in the two-phase stepping motor stops according to the embodiment and an angle at which the rotor is stably stopped.

FIG. 4A illustrates a state in which no current flows through both the coil 440 and the coil 460. In this case, neither the coil 440 nor the coil 460 generates the magnetic flux. Therefore, none of the first magnetic pole portion, the second magnetic pole portion, and the third magnetic pole portion is excited. Therefore, the rotor 420 is stably stopped at 180 degrees which is an angle determined by the cutout 414a and the cutout 414b.

Figure 4B:
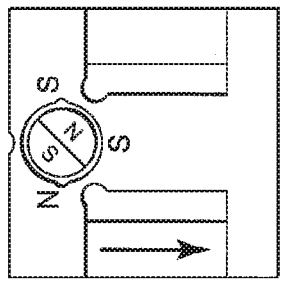

FIG. 4B illustrates a state in which the driving circuit 24 sets the voltage at the terminal Out4 and the voltage at the terminal Out3 of the coil 440 to the low level, sets the voltage at the terminal Out1 of the coil 460 to the low level, and sets the voltage at the terminal Out2 to the high level. In this case, the coil 440 does not generate the magnetic flux. On the other hand, the coil 460 generates the magnetic flux in the −Y direction. Therefore, the first magnetic pole portion is excited to the N pole, the second magnetic pole portion is excited to the S pole, and the third magnetic pole portion is excited to the N pole. Therefore, since the N pole is attracted to the second magnetic pole portion and the S pole is attracted to the first magnetic pole portion and the third magnetic pole portion, the rotor 420 is stably stopped in a state of being rotated 225 degrees clockwise. The driving pulse for generating the magnetic flux illustrated in FIG. 4B is called a 225-degree driving pulse.

Figure 4C:
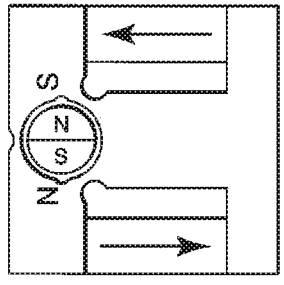

FIG. 4C illustrates a state in which the driving circuit 24 sets the voltage at the terminal Out4 of the coil 440 to the high level, sets the voltage at the terminal Out3 to the low level, sets the voltage at the terminal Out1 of the coil 460 to the low level, and sets the voltage at the terminal Out2 to the high level. In this case, the coil 440 generates the magnetic flux in the +Y direction. On the other hand, the coil 460 generates the magnetic flux in the −Y direction. Therefore, the first magnetic pole portion is excited to the N pole, the second magnetic pole portion is excited to the S pole, and the magnetic flux generated by the coil 440 and the magnetic flux generated by the coil 460 cancel each other in the third magnetic pole portion. Therefore, since the N pole is attracted to the second magnetic pole portion and the S pole is attracted to the first magnetic pole portion, the rotor 420 is stably stopped in a state of being rotated 270 degrees clockwise. The driving pulse for generating the magnetic flux illustrated in FIG. 4C is called a 270-degree driving pulse.

Figure 4D:
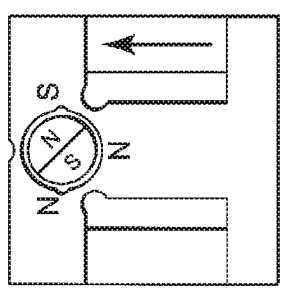

FIG. 4D illustrates a state in which the driving circuit 24 sets the voltage at the terminal Out4 of the coil 440 to the high level, sets the voltage at the terminal Out3 to the low level, and sets the voltage at the terminal Out1 and the voltage at the terminal Out2 of the coil 460 to the low level. In this case, the coil 440 generates the magnetic flux in the +Y direction. On the other hand, the coil 460 does not generate the magnetic flux. Therefore, the first magnetic pole portion is excited to the N pole, the second magnetic pole portion is excited to the S pole, and the third magnetic pole portion is excited to the S pole. Therefore, since the N pole is attracted to the second magnetic pole portion and the third magnetic pole portion, and the S pole is attracted to the first magnetic pole portion, the rotor 420 is stably stopped in a state of being rotated 315 degrees clockwise. The driving pulse for generating the magnetic flux illustrated in FIG. 4D is called a 315-degree driving pulse.

Figure 4E:
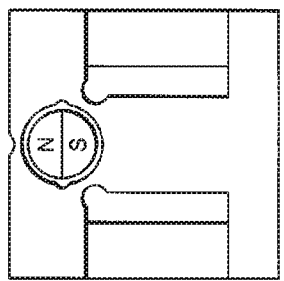

FIG. 4E illustrates a state in which the driving circuit 24 sets the voltage at the terminal Out4 of the coil 440 to the high level, sets the voltage at the terminal Out3 to the low level, sets the voltage at the terminal Out1 of the coil 460 to the high level, and sets the voltage at the terminal Out2 to the low level. In this case, the coil 440 and the coil 460 generate the magnetic flux in the +Y direction. Therefore, the first magnetic pole portion is excited to the N pole, the second magnetic pole portion is excited to the N pole, and the third magnetic pole portion is excited to the S pole. Therefore, since the N pole is attracted to the third magnetic pole portion and the S pole is attracted to the first magnetic pole portion and the second magnetic pole portion, the rotor 420 is stably stopped in a state of being rotated 0 degrees clockwise. The driving pulse for generating the magnetic flux illustrated in FIG. 4E is called a 0-degree driving pulse.

In a case in which any of the driving pulses described above is input to the coil 440 and the coil 460, the rotor 420 may be stably stopped, for example, at an angle different from the angle described above due to a factor such as a design of the stator 410. The rotor 420 may be rotated beyond an angle at which the rotor 420 is stably stopped, but when the rotor 420 exceeds the angle, the rotor 420 is braked by the first magnetic pole portion, the second magnetic pole portion, and the third magnetic pole, and the rotor 420 finally returns to the stable stopped angle.

When the rotor 420 is stably rotated at a high speed, the motor driving apparatus 2 can execute both a control for not providing a standby time that is a time during which the driving pulse is not input to the two-phase stepping motor 4 and a control for providing the standby time, each time the rotor 420 is rotated one step, that is, 180 degrees. Therefore, in the following description, a case in which the motor driving apparatus 2 executes the control for not providing the standby time and a case in which the motor driving apparatus 2 executes the control for providing the standby time will be described.

Figure 5:
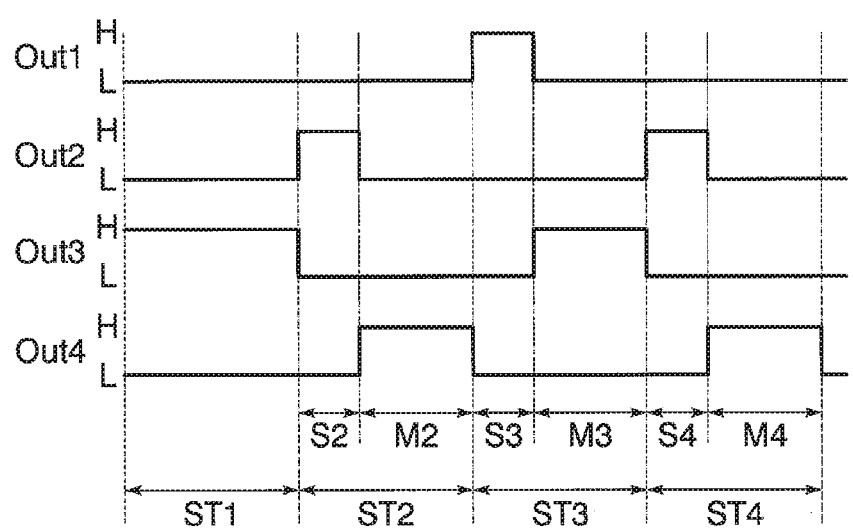
FIG. 5 is a graph illustrating an example of a voltage applied to each terminal of the coil according to the embodiment.

First, the case in which the motor driving apparatus 2 performs the control for not providing the standby time will be described. FIG. 5 is a graph illustrating an example of the voltage applied to each terminal of the coil according to the embodiment. It is assumed that the rotor 420 is stably stopped at 0 degrees at a time point when a period ST1 starts.

Figure 6:
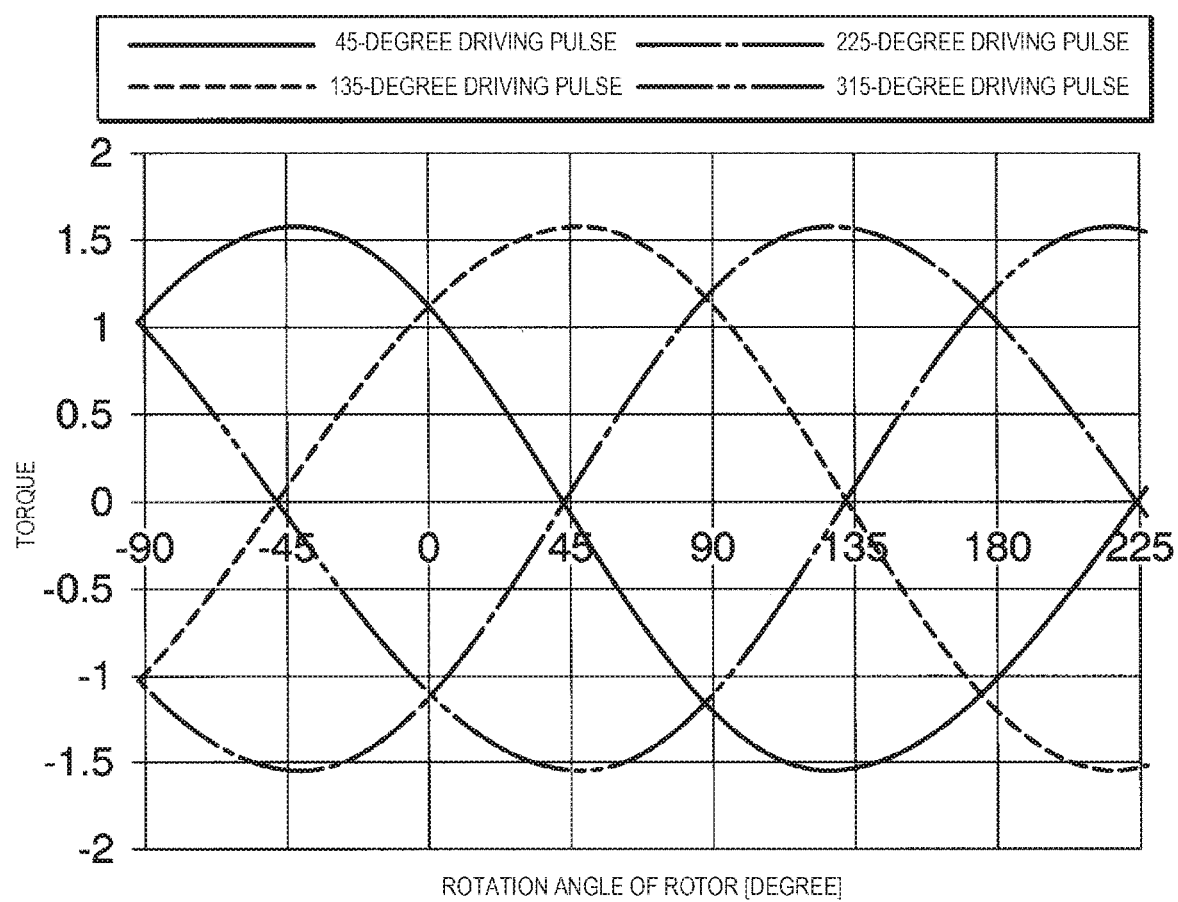
FIG. 6 is a graph illustrating an example of a relationship between an angle of the rotor included in the two-phase stepping motor according to the embodiment and a torque applied to the rotor.

FIG. 6 is a graph illustrating an example of a relationship between an angle of the rotor included in the two-phase stepping motor according to the embodiment and a torque applied to the rotor. A horizontal axis in FIG. 6 indicates the angle of the rotor 420. A vertical axis in FIG. 6 indicates the torque applied to the rotor 420. When the torque illustrated in FIG. 6 is positive, the torque allows the rotor 420 to rotate in the forward direction. On the other hand, when the torque illustrated in FIG. 6 is negative, the torque allows the rotor 420 to rotate in the reverse direction.

In the period ST1, the driving circuit 24 supplies a second driving pulse with which the second coil generates a second magnetic flux opposite to the first magnetic flux to the two-phase stepping motor 4. Here, the first magnetic flux is a magnetic flux generated by the coil 440 or the coil 460 in the ±Y direction illustrated in FIG. 2, and excites the first magnetic pole portion in the center yoke 411 to the S pole. The second magnetic flux is a magnetic flux generated by the coil 440 or the coil 460 in the −Y direction illustrated in FIG. 2, and excites the first magnetic pole portion in the center yoke 411 to the N pole. Thus, directions of the magnetic fluxes flowing through the center yoke 411 are opposite to each other in the first magnetic flux and the second magnetic flux. For example, as illustrated in FIG. 5, in the period ST1, the driving circuit 24 sets the voltage at the terminal Out4 of the coil 440 to the low level, sets the voltage at the terminal Out3 to the high level, sets the voltage at the terminal Out2 of the coil 460 to the low level, and sets the voltage at the terminal Out1 to the low level. That is, in the period ST1, the driving circuit 24 inputs the 135-degree driving pulse to the two-phase stepping motor 4. In this case, as illustrated in FIG. 6, since the torque at 0 degrees of the 135-degree driving pulse is positive, the rotor 420 is rotated in the forward direction to an angle slightly exceeding 135 degrees by the 135-degree driving pulse, and is rotated in the forward direction to 180 degrees by a magnetic potential by the cutout 414*b*.

In a period S2 of a period ST2, the driving circuit 24 supplies a third driving pulse with which the first coil generates the second magnetic flux to the two-phase stepping motor 4. For example, as illustrated in FIG. 5, in the period S2, the driving circuit 24 sets the voltage at the terminal Out4 of the coil 440 to the low level, sets the voltage at the terminal Out3 to the low level, sets the voltage at the terminal Out2 of the coil 460 to the high level, and sets the voltage at the terminal Out1 to the low level. That is, in the period S2, the driving circuit 24 inputs the 225-degree driving pulse to the two-phase stepping motor 4. In this case, as illustrated in FIG. 6, since the torque at 180 degrees of the 225-degree driving pulse is positive, the rotor 420 is rotated in the forward direction to an angle slightly exceeding 225 degrees by the 225-degree driving pulse.

In a period M2 of the period ST2, the driving circuit 24 supplies a fourth driving pulse with which the second coil generates the first magnetic flux to the two-phase stepping motor 4. For example, as illustrated in FIG. 5, in the period M2, the driving circuit 24 sets the voltage at the terminal Out4 of the coil 440 to the high level, sets the voltage at the terminal Out3 to the low level, sets the voltage at the terminal Out2 of the coil 460 to the low level, and sets the voltage at the terminal Out1 to the low level. That is, in the period M2, the driving circuit 24 inputs the 315-degree driving pulse to the two-phase stepping motor 4. In this case, as illustrated in FIG. 6, since the torque in the vicinity of 180 degrees of the 315-degree driving pulse is positive, the rotor 420 is rotated in the forward direction to an angle slightly exceeding 315 degrees by the 315-degree driving pulse, and is rotated in the forward direction to 180 degrees by the magnetic potential by the cutout 414*a*.

In a period S3 of a period ST3, the driving circuit 24 supplies the first driving pulse with which the first coil generates the first magnetic flux to the two-phase stepping motor 4. For example, as illustrated in FIG. 5, in the period S3, the driving circuit 24 sets the voltage at the terminal Out4 of the coil 440 to the low level, sets the voltage at the terminal Out3 to the low level, sets the voltage at the terminal Out2 of the coil 460 to the low level, and sets the voltage at the terminal Out1 to the high level. That is, in the period S3, the driving circuit 24 inputs the 45-degree driving pulse to the two-phase stepping motor 4. In this case, as illustrated in FIG. 6, since the torque at 0 degrees of the 45-degree driving pulse is positive, the rotor 420 is rotated in the forward direction to an angle slightly exceeding 45 degrees by the 45-degree driving pulse.

In a period M3 of a period ST3, the driving circuit 24 supplies the second driving pulse with which the second coil generates the second magnetic flux opposite to the first magnetic flux to the two-phase stepping motor 4. For example, as illustrated in FIG. 5, in the period M3, the driving circuit 24 sets the voltage at the terminal Out4 of the coil 440 to the low level, sets the voltage at the terminal Out3 to the high level, sets the voltage at the terminal Out2 of the coil 460 to the low level, and sets the voltage at the terminal Out1 to the low level. That is, in the period M3, the driving circuit 24 inputs the 135-degree driving pulse to the two-phase stepping motor 4. In this case, as illustrated in FIG. 6, since the torque at 45 degrees of the 135-degree driving pulse is positive, the rotor 420 is rotated in the forward direction to an angle slightly exceeding 135 degrees by the 135-degree driving pulse and is rotated in the forward direction to 180 degrees by the magnetic potential by the cutout 414*b*.

In a period S4 of a period ST4, the driving circuit 24 supplies a third driving pulse with which the first coil generates the second magnetic flux to the two-phase stepping motor 4. For example, as illustrated in FIG. 5, in the period S4, the driving circuit 24 sets the voltage at the terminal Out4 of the coil 440 to the low level, sets the voltage at the terminal Out3 to the low level, sets the voltage at the terminal Out2 of the coil 460 to the high level, and sets the voltage at the terminal Out1 to the low level. That is, in the period S2, the driving circuit 24 inputs the 225-degree driving pulse to the two-phase stepping motor 4. In this case, as illustrated in FIG. 6, since the torque at 180 degrees of the 225-degree driving pulse is positive, the rotor 420 is rotated in the forward direction to an angle slightly exceeding 225 degrees by the 225-degree driving pulse.

In a period M4 of the period ST4, the driving circuit 24 supplies a fourth driving pulse with which the second coil generates the first magnetic flux to the two-phase stepping motor 4. For example, as illustrated in FIG. 5, in the period S4, the driving circuit 24 sets the voltage at the terminal Out4 of the coil 440 to the high level, sets the voltage at the terminal Out3 to the low level, sets the voltage at the terminal Out2 of the coil 460 to the low level, and sets the voltage at the terminal Out1 to the low level. That is, in the period M4, the driving circuit 24 inputs the 315-degree driving pulse to the two-phase stepping motor 4. In this case, as illustrated in FIG. 6, since the torque at 225 degrees of the 315-degree driving pulse is positive, the rotor 420 is rotated in the forward direction to an angle slightly exceeding 315 degrees by the 315-degree driving pulse, and is rotated in the forward direction to 360 degrees, that is, 0 degrees by the magnetic potential by the cutout 414*a*.

Thereafter, the driving circuit 24 repeatedly supplies the first driving pulse, the second driving pulse, the third driving pulse, and the fourth driving pulse in this order to the two-phase stepping motor 4, and continuously rotates the rotor 420 at a high speed.

As described above, the driving circuit 24 supplies the second driving pulse, the third driving pulse, and the fourth driving pulse in this order to the two-phase stepping motor 4 in a state of being stopped to start the two-phase stepping motor 4. In addition, the driving circuit 24 supplies the first driving pulse, the second driving pulse, the third driving pulse, and the fourth driving pulse in this order to the two-phase stepping motor 4 after starting to continuously drive the two-phase stepping motor 4.

When the driving circuit 24 continuously rotates the rotor 420 at a high speed, the control circuit 23 prohibits the driving circuit from supplying the driving pulse that simultaneously generates the first magnetic flux in the coil 440 and the coil 460, that is, the driving pulse illustrated in FIG. 4E, and the driving pulse that simultaneously generates the second magnetic flux in the coil 440 and the coil 460, that is, the driving pulse illustrated in FIG. 3E, to the two-phase stepping motor 4. That is, the control circuit 23 controls the driving circuit 24 so that the driving pulse for braking the rotation of the rotor 420 is not supplied to the two-phase stepping motor 4 when the driving circuit 24 continuously rotates the rotor 420 at a high speed.

Further, the control circuit 23 may control pulse lengths of the first driving pulse, the second driving pulse, the third driving pulse, and the fourth driving pulse. Specifically, the control circuit 23 may control at least one length of the period ST1, the period S2, the period M2, the period S3, the period M3, the period S4, the period M4, and the like illustrated in FIG. 5.

The control circuit 23 may control the driving circuit 24, so that energy of the second driving pulse supplied to the two-phase stepping motor 4 in the state of being stopped is larger than energy of the second driving pulse supplied to the two-phase stepping motor 4 after starting.

In addition, the control circuit 23 may control the driving circuit 24, so that the length of the second driving pulse supplied to the two-phase stepping motor 4 in the state of being stopped is longer than the length of the second driving pulse supplied to the two-phase stepping motor 4 after starting.

Figure 7:
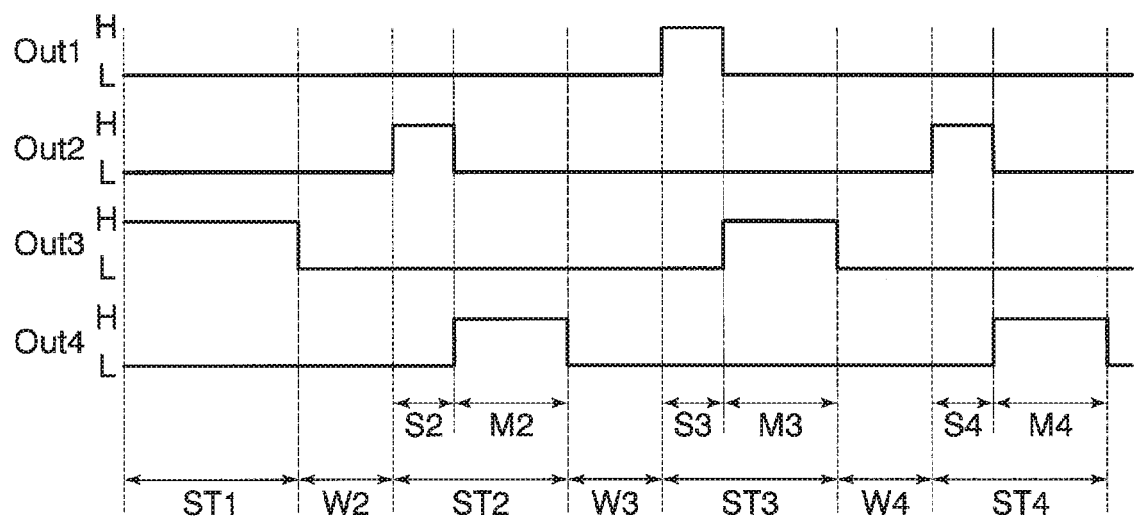
FIG. 7 is a graph illustrating an example of a voltage applied to each terminal of the coil according to the embodiment.

Next, a case in which the motor driving apparatus 2 executes the control for providing the standby time will be described. FIG. 7 is a graph illustrating an example of the voltage applied to each terminal of the coil according to the embodiment. Further, it is assumed that the rotor 420 is stably stopped at 0 degrees at a time point when a period ST1 starts.

Figure 8:
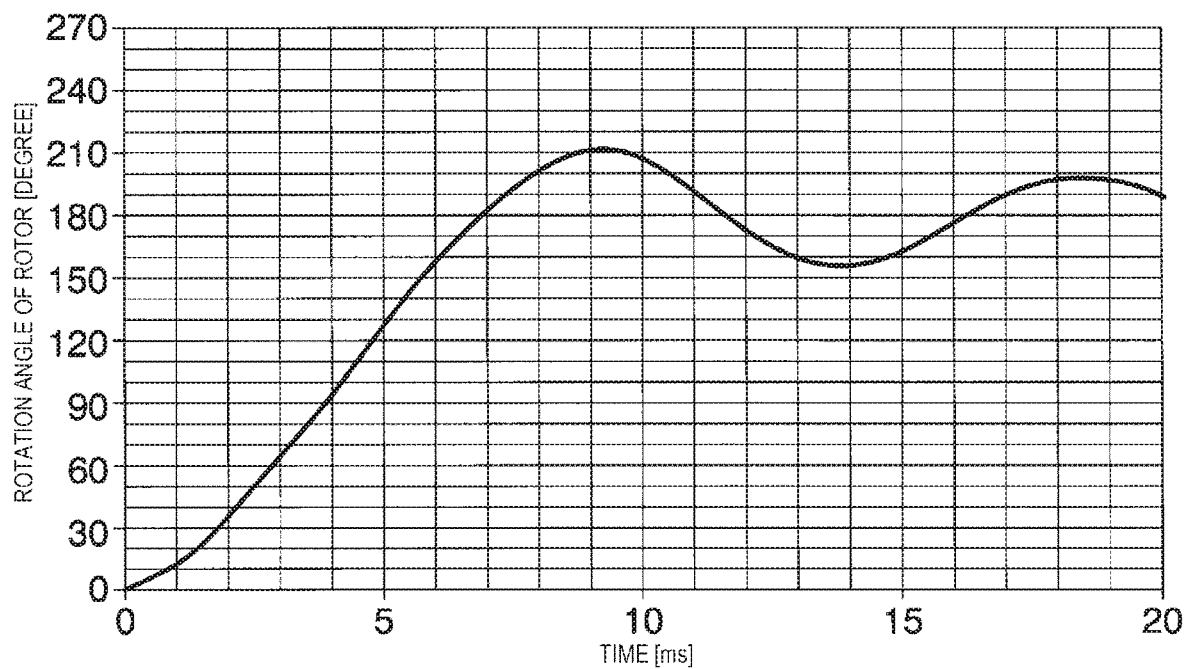
FIG. 8 is a graph illustrating an example of a change in an angle of the rotor when the rotor included in the two-phase stepping motor according to the embodiment is rotated one step.

FIG. 8 is a graph illustrating an example of a change in the angle of the rotor when the rotor included in the two-phase stepping motor according to the embodiment is rotated one step. A horizontal axis in FIG. 8 indicates time. A vertical axis in FIG. 8 indicates the angle of the rotor 420.

When the two-phase stepping motor 4 is continuously driven, the control circuit 23 controls the driving circuit 24 to provide a standby time between the timing for supplying the second driving pulse and the timing for supplying the third driving pulse, and between the timing for supplying the fourth driving pulse and the timing for supplying the first driving pulse. Specifically, as illustrated in FIG. 7, the control circuit 23 controls the driving circuit 24 to provide a standby time W2 between the period ST1 during which the second driving pulse is supplied and the period S2 during which the third driving pulse is supplied, and to provide a standby time W3 between the period M2 during which the fourth driving pulse is supplied and the period S3 during which the first driving pulse is supplied. Similarly, the control circuit 23 controls the driving circuit 24 to provide a standby time W4 between the period M3 during which the second driving pulse is supplied and the period S4 during which the third driving pulse is supplied.

The driving circuit 24 supplies the second driving pulse in the period ST1 to rotate the rotor 420 in the forward direction. In this case, for example, as illustrated in FIG. 8, the angle of the rotor 420 increases from 0 degrees, exceeds 180 degrees, which is an angle at which the rotor is stably stopped in 7 ms, and then increases to substantially 210 degrees in 9 ms by the inertia, decreases to substantially 150 degrees in substantially 14 ms, and again exceeds 180 degrees in substantially 16 ms.

Therefore, when the standby time W2 is shorter than a predetermined time, for example, 16 ms, the control circuit 23 controls the driving circuit 24 to supply the third driving pulse from a time point of 7 ms in which the rotor 420 exceeds 180 degrees at which the rotor 420 is stably stopped after the 135-degree driving pulse is input, to a time point of 16 ms in which the rotor 420 exceeds 180 degrees again. As illustrated in FIG. 6, the 225-degree driving pulse generates a positive torque when the angle of the rotor 420 is in a range of 45 degrees to 225 degrees. Therefore, the motor driving apparatus 2 stably rotates the rotor 420 at a high speed even after the rotor 420 is rotated in the forward direction from 0 degrees to 180 degrees.

Further, the driving circuit 24 may continuously drive the two-phase stepping motor 4 when the standby time described above is shorter than a predetermined time.

Heretofore, the timepiece 1 according to the embodiment is described focusing on the motor driving apparatus 2. The motor driving apparatus 2 supplies the second driving pulse, the third driving pulse, and the fourth driving pulse in this order to the two-phase stepping motor 4 in the state of being stopped to start the two-phase stepping motor. In addition, the motor driving apparatus 2 supplies the first driving pulse, the second driving pulse, the third driving pulse, and the fourth driving pulse in this order to the two-phase stepping motor after starting to continuously drive the two-phase stepping motor. That is, the motor driving apparatus 2 supplies the third driving pulse after the second driving pulse and supplies the first driving pulse after the fourth driving pulse to continuously generate a torque for rotating the rotor 420 in the forward direction. Therefore, the motor driving apparatus 2 can stably rotate the rotor 420 at a high speed.

Further, when the standby times described above, for example, the standby time W2, the standby time W3, and the standby time W4 are shorter than a predetermined time, the control circuit 23 controls the driving circuit 24 to continuously drive the two-phase stepping motor. Therefore, even when the standby time is short and shaking of the rotor 420 is not sufficiently converged, the motor driving apparatus 2 inputs the driving pulse with which the torque for rotating the rotor 420 in the forward direction is generated, and can stably rotate the rotor 420 in the forward direction.

The control circuit 23 controls the pulse lengths of the first driving pulse, the second driving pulse, the third driving pulse, and the fourth driving pulse. Therefore, the motor driving apparatus 2 can appropriately control the torque for rotating the rotor 420 in the forward direction by these controls, and can stably rotate the rotor 420 in the forward direction.

The control circuit 23 controls the driving circuit 24, so that the energy of the second driving pulse supplied to the two-phase stepping motor 4 in the state of being stopped is larger than the energy of the second driving pulse supplied to the two-phase stepping motor 4 after starting. Alternatively, the control circuit 23 controls the driving circuit 24, so that the length of the second driving pulse supplied to the two-phase stepping motor 4 in the state of being stopped is longer than the length of the second driving pulse supplied to the two-phase stepping motor 4 after starting. Therefore, even in a state in which the rotor 420 is stopped and the inertia that is rotated in the forward direction does not work, the motor driving apparatus 2 is configured so that the torque for starting the rotation of the rotor 420 in the forward direction is greater than the torque for continuously rotating the rotor 420 in the forward direction, and the rotor 420 can be stably rotated in the forward direction.

In the embodiment described above, a case in which the motor driving apparatus 2 rotates the rotor 420 in the forward direction is described as an example, but the present invention is not limited to this. The motor driving apparatus 2 may rotate the rotor 420 in the reverse direction by the method described above.

In FIGS. 5 and 7, a case in which the voltage input to the terminal Out4 and the terminal Out3 of the coil 440, and the voltage input to the terminal Out2 and the terminal Out1 of the coil 460 are rectangular pulses is exemplified, but the present invention is not limited to this. For example, the voltage input to these terminals may be a comb-like pulse. Furthermore, a duty ratio of the voltages input to these terminals may be appropriately controlled.

In the embodiment described above, a case in which the second driving pulse is supplied in the period ST1, the third driving pulse is supplied in the period S2, the fourth driving pulse is supplied in the period M2, and the first driving pulse is supplied in the period S3, the second driving pulse is supplied in the period M3, the third driving pulse is supplied in the period S4, and the fourth driving pulse is supplied in the period M4 is described as an example, but the present invention is not limited to this. For example, when the rotor 420 is stopped at an angle of 180 degrees, the fourth driving pulse may be supplied in the period ST1, the first driving pulse may be supplied in the period S2, the second driving pulse may be supplied in the period M2, and the third driving pulse may be supplied in the period S3, the fourth driving pulse may be supplied in the period M3, the first driving pulse may be supplied in the period S4, and the second driving pulse may be supplied in the period. M4.

In the embodiment described above, a case in which the rotor 420 starts the rotation in the forward direction from the state in which the angle of the rotor 420 is 0 degrees is described as an example, but the present invention is not limited to this. The motor driving apparatus 2 can stably rotate the rotor 420 at a high speed by the method described above even when the rotor 420 is stopped at an angle other than 0 degrees.

All or a part of the functions of the timepiece 1 described above may be recorded on a computer-readable recording medium as a motor driving program, and the program may be executed by a computer system. The computer system includes an OS and hardware such as a peripheral device. The computer-readable recording medium includes, for example, a portable medium such as a flexible disk, a magneto-optical disk, a Read Only Memory (ROM), or a CD-ROM, a storage device such as a hard disk built in a computer system, or a Random Access Memory (RAM) provided in a server on a network such as the Internet. The RAM is an example of a recording medium that holds a program for a certain period of time.

The motor driving program described above may be transmitted to another computer system via a transmission medium, for example, a network such as the Internet or a communication line such as a telephone line.

Further, the motor driving program described above may be a program that realizes all or a part of the functions described above. The program that realizes a part of the functions described above may be a program that can realize the functions described above in combination with a program that is recorded in advance in a computer system, that is, a so-called differential program.

As mentioned above, although the form for implementing the present invention was demonstrated using the embodiment, the present invention is not limited to such an embodiment, and various modifications and substitutions can be made without departing from the scope of the present invention.

What is claimed is:

1. A motor driving apparatus for driving a two-phase stepping motor with a rotor, and first and second coils, the apparatus comprising:
    a driving circuit configured to supply a first driving pulse through the first coil to generate a first magnetic flux, a second driving pulse through the second coil to generate a second magnetic flux opposite to the first magnetic flux, a third driving pulse through the first coil to generate the second magnetic flux, and a fourth driving pulse through the second coil to generate the first magnetic flux, wherein the first, second, third and fourth driving pulses each selectively energize the first or second coil to rotate the rotor, and
    wherein the driving circuit is configured to supply a first series of driving pulses to start rotation of the rotor from a stationary state thereof into a rotating state thereof, and cyclically supply a second series of driving pulses to maintain the rotation of the rotor while in the rotating state, wherein the first series of driving pulses consists of the second driving pulse, the third driving pulse, and the fourth driving pulse in this order, and the second series of driving pulses consists of the first driving pulse, the second driving pulse, the third driving pulse, and the fourth driving pulse in this order.

2. The motor driving apparatus according to claim 1, wherein the driving circuit is configured to insert a standby time between a supply of the second driving pulse and a supply of the third driving pulse, and insert the standby time between a supply of the fourth driving pulse and a supply of the first driving pulse, and
    wherein the driving circuit is configured to set the standby time shorter than a predetermined time to continuously drives the rotor.

3. The motor driving apparatus according to claim 1, further comprising a control circuit configured to control pulse lengths of the first driving pulse, the second driving pulse, the third driving pulse, and the fourth driving pulse.

4. The motor driving apparatus according to claim 2, further comprising a control circuit configured to control pulse lengths of the first driving pulse, the second driving pulse, the third driving pulse, and the fourth driving pulse.

5. The motor driving apparatus according to claim 1, wherein the driving circuit is configured to adjust energy of the second driving pulse so that the second driving pulse in the first series of driving noises has energy higher than energy of the second driving pulses in the second series of driving pulses.

6. The motor driving apparatus according to claim 2, wherein the driving circuit is configured to adjust energy of the second driving pulse so that the second driving pulse in the first series of driving pulses has energy higher than energy of the second driving pulses in the second series of driving pulses.

7. The motor driving apparatus according to claim 3, wherein the driving circuit is configured to adjust energy of the second driving pulse so that the second driving pulse in the first series of driving pulses has energy higher than energy of the second driving pulses in the second series of driving pulses.

8. The motor driving apparatus according to claim 4, wherein the driving circuit is configured to adjust energy of the second driving pulse so that the second driving pulse in the first series of driving pulses has energy higher than energy of the second driving pulses in the second series of driving pulses.

9. The motor driving apparatus according to claim 5, wherein the driving circuit is configured to adjust a pulse length of the second driving pulse so that the second driving pulse in the fast series of driving pulses has a pulse length longer than a pulse length of the second driving pulses in the second series of driving pulses.

10. The motor driving apparatus according to claim 6, wherein the driving circuit is configured to adjust a pulse length of the second driving pulse so that the second driving pulse in the first series of driving pulses has a pulse length longer that a pulse length of the second driving pulses in the second series of driving pulses.

11. The motor driving apparatus according to claim 7, wherein the driving circuit is configured to adjust a pulse length of the second driving pulse so that the second driving pulse in the first series of driving pulses has a pulse length longer than a pulse length of the second driving pulses in the second series of driving pulses.

12. The motor driving apparatus according to claim 8, wherein the driving circuit is configured to adjust a pulse length of the second driving pulse so that the second driving pulse in the fast series of driving pulses has a pulse length longer than a pulse length of the second driving pulses in the second series of driving pulses.

13. A method for driving a two-phase stepping motor that comprises a rotor, a first coil and a second coil, the method comprising:

supplying a first driving pulse through the first coil to generate a first magnetic flux, a second driving pulse through the second coil to generate a second magnetic flux opposite to the first magnetic flux, a third driving pulse through the first coil to generate the second magnetic flux, and a fourth driving pulse through the second coil to generate the first magnetic flux, wherein the first, second, third and fourth driving pulses each selectively energize the first or second coil to rotate the rotor, and wherein said supplying step comprises supplying a first series of driving pulses to start rotation of the rotor from a stationary state thereof into a rotating state thereof, and cyclically supplying a second series of driving pulses to maintain the rotation of the rotor while in the rotating state, wherein the first series of driving poises consists of the second driving pulse, the third driving pulse, and the fourth driving pulse in this order, and the second series of driving pulses consists of the first driving pulse, the second driving pulse, the third driving pulse, and the fourth driving pulse in this order.

14. A timepiece comprising the motor driving apparatus according to claim 1.

* * * * *